Figure 1:
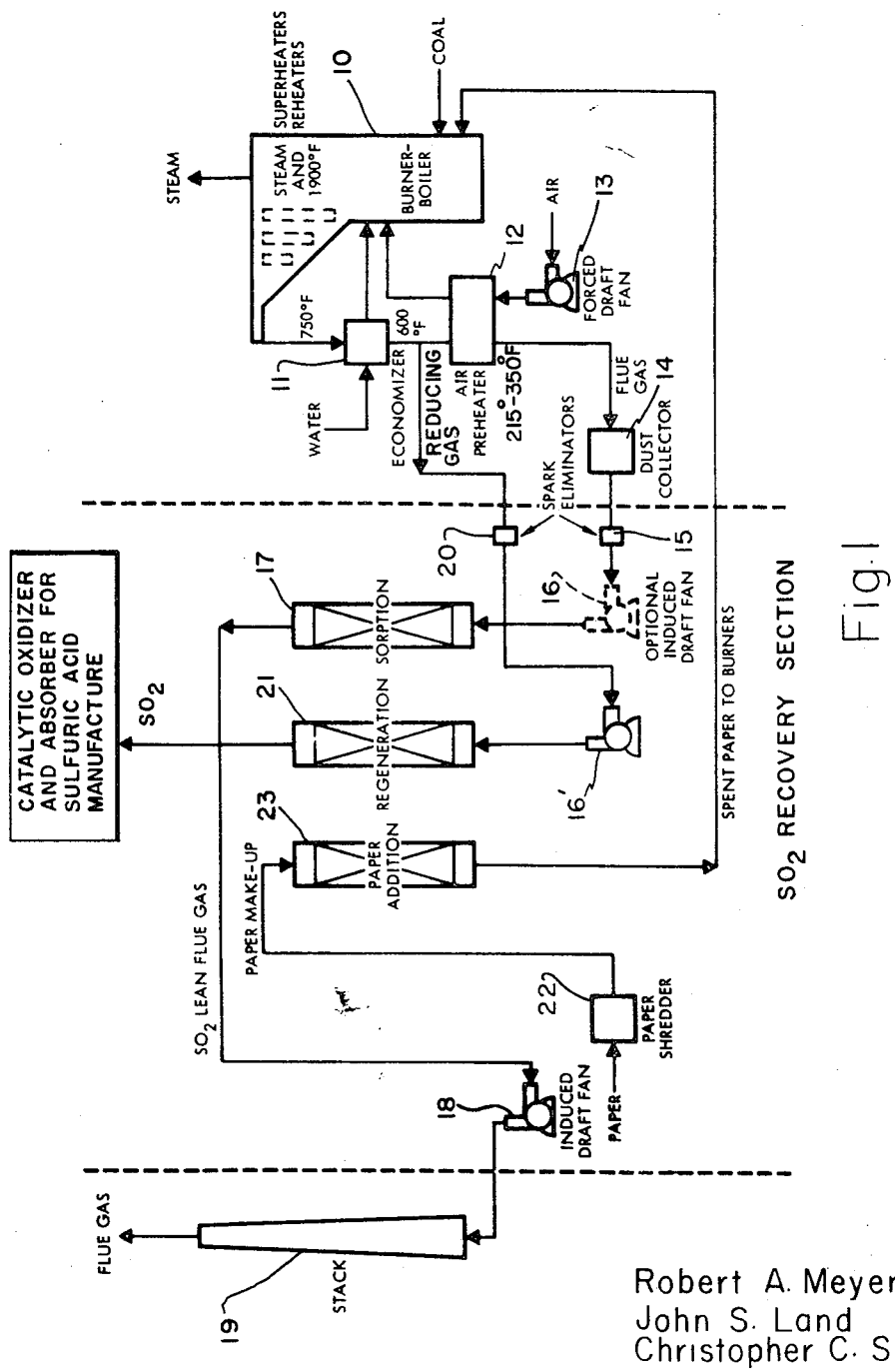

United States Patent

[11] 3,629,996

[72] Inventors Robert A. Meyers
Encino;
John S. Land, Hermosa Beach; Christopher C. Shih, Inglewood; Jerry L. Lewis, Cypress, all of Calif.
[21] Appl. No. 12,770
[22] Filed Feb. 19, 1970
[45] Patented Dec. 28, 1971
[73] Assignee TRW Inc.
Redondo Beach, Calif.

[54] CELLULOSICS FOR THE REMOVAL OF SULFUR DIOXIDE FROM FLUE GAS STREAMS
7 Claims, 2 Drawing Figs.

[52] U.S. Cl. .................................................. 55/73,
55/74, 23/2.1, 99/2
[51] Int. Cl. ............................................ B01d 53/04,
B01d 47/00, A23k 1/00
[50] Field of Search .......................................... 55/73, 74;
23/2.1, 178; 99/2; 127/37; 162/64

[56] References Cited
UNITED STATES PATENTS
2,190,194  2/1940  Richter .................... 162/64

| | | | |
|---|---|---|---|
| 3,284,158 | 11/1966 | Johswich .................... | 55/73 |
| 2,759,856 | 8/1956 | Saums et al. ................ | 127/37 |

OTHER REFERENCES

Kateu, Chemical Engineering Progress, " Removing Sulfur Dioxide from Flue Gases," Vol. 62, No. 10, Oct. 1966, pp. 67–73.

*Primary Examiner*—Reuben Friedman
*Assistant Examiner*—Charles N. Hart
*Attorneys*—Daniel T. Anderson, James V. Tura and Alan D. Akers

ABSTRACT: Sulfur dioxide contained in flue gases from a coal-burning, thermal generating plant are sorbed on finely divided cellulose such a shredded paper at temperatures in the range of 215° to 300° F. After the cellulose has been saturated with the sulfur dioxide, it is desorbed by flue gas at about 350°–450π ζ f. The desorbed sulfur dioxide may be then conveniently forwarded to a plant for processing to sulfuric acid. Spent cellulose may be forwarded to the plant for burning or it may be further digested to carbohydrates.

Robert A. Meyers
John S. Land
Christopher C. Shih
Jerry L. Lewis
INVENTORS

BY

James V. Tura
ATTORNEY

CELLULOSICS FOR THE REMOVAL OF SULFUR DIOXIDE FROM FLUE GAS STREAMS

The invention described herein was made in the course of work under a grant or award from the Department of Health, Education and Welfare.

THE INVENTION

This invention relates to a new and improved process for removing sulfur dioxide from flue gas. More specifically, this invention relates to the use of cellulose as a sorbent for sulfur dioxide contained in off gases, such as flue gas, smelter gas, etc. at relatively high temperatures.

The use of coal in thermal generating stations is widespread but is associated with the production of effluent gases which are regarded as major contributors to air pollution. Because it is not economically feasible to remove sulfur dioxide from a flue gas stream, the gases are simply emitted into the atmosphere through high stacks in the hope that they will be carried into the atmosphere and away from the surrounding populated areas. On a long-term basis, this procedure has proved to be unhealthy not only from the standpoint of people and ecology who are downwind, but also from the standpoint of the immediate areas, since weather conditions such as temperature inversions and local wind patterns may cause the flue gases to become stagnant.

The use of cellulose materials at extremely low concentrations e.g., 6 p.p.m. and at low temperatures (e.g., 25° C.), is well known as a sorbent for sulfur dioxide; however, while cellulose materials are by their nature inexpensive, they have never been utilized commercially for this purpose because of the lengthy desorption times required, which are in the order of many days.

Also, it was not known that sulfur dioxide could be desorbed at all from the cellulose.

It is, therefore, an object of this invention to provide a process for removing sulfur dioxide from off gases, such as flue gas, by means of cellulose.

Another object is to provide a process for the removal of sulfur dioxide from the flue gas of a coal-burning thermal station.

Another object of this invention is to provide a process for the removal of sulfur dioxide from flue gas at high temperatures by means of cellulose material and the regeneration of the sulfur dioxide from the cellulose, also at high temperatures.

Another object of this invention is to provide a process for rapidly reacting cellulose with gases containing a high concentration of sulfur dioxide.

Another object is to provide a cellulose-sulfur dioxide reaction product which can be used as an intermediate in the formation of carbohydrates.

Another object of this invention is to provide an apparatus for the removal of sulfur dioxide from flue gas.

Other objects of the invention will become apparent from the description to follow:

According to the invention, it has been discovered that the sorption of sulfur dioxide by finely divided cellulose materials from off gases, including flue gas, smelter off gas, etc., takes place quickly at high temperatures and is effective over a wide concentration range of at least 500–50,000 p.p.m.

It has been further discovered that within a preferred temperature range, the desorption of sulfur dioxide from the cellulose also occurs quickly. This not only permits efficient utilization of the cellulose, but also enables cycling of the cellulose from desorption to sorption and vice versa. As a consequence, a large cellulose inventory is not required; furthermore, rapid cycling permits conservation of the heat contained in the cellulose.

In actual operation the sorption is carried out at a fairly high temperature, in the range of about 215° to 300° F., while further application of heat to the cellulose in the range of about 350° to 450° F. will rapidly desorb the sulfur dioxide. The maximum desorption temperature which is employed is below the burning or decomposition temperature of the cellulose.

Finely divided cellulose materials which may be employed include wood chips, wood shavings, sawdust, cotton, corrugated paper, jute, straw, etc., however, shredded newsprint is preferred.

The typical composition of a flue gas which may be treated is as follows (on a volume % basis): nitrogen—74%; carbon dioxide—15%; water—7% oxygen—3%; sulfur dioxide—1%; and nitrogen oxides—a trace (approximately 0.05%). The fly ash concentration may be about 0.2% by weight. This composition is set by the Department of Health, Education, and Welfare for evaluating $SO_2$ removal systems.

As an example, a 1,300 megawatt power plant burning 480 tons of 4 percent sulfur coal per hour has been calculated to recover $5.6 \times 10^8$ pounds per year of sulfur dioxide. The desorption times can be as low as about 1–10 minutes whereas at low temperature there is no effective desorption at all. Following desorption, the sulfur dioxide is converted into a saleable product, such as sulfuric acid; for the above figures, this mode of operation can actually result in a considerable profit.

Alternatively, instead of employing a desorption step, the sulfur dioxide may be used to react with the cellulose and thus convert it to a carbohydrate precursor; further reaction will convert the precursor to a carbohydrate suitable for an animal food. This is shown in the following reactions:

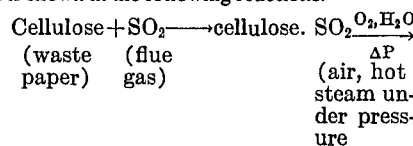

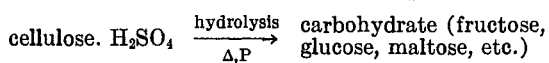

Figure 2:
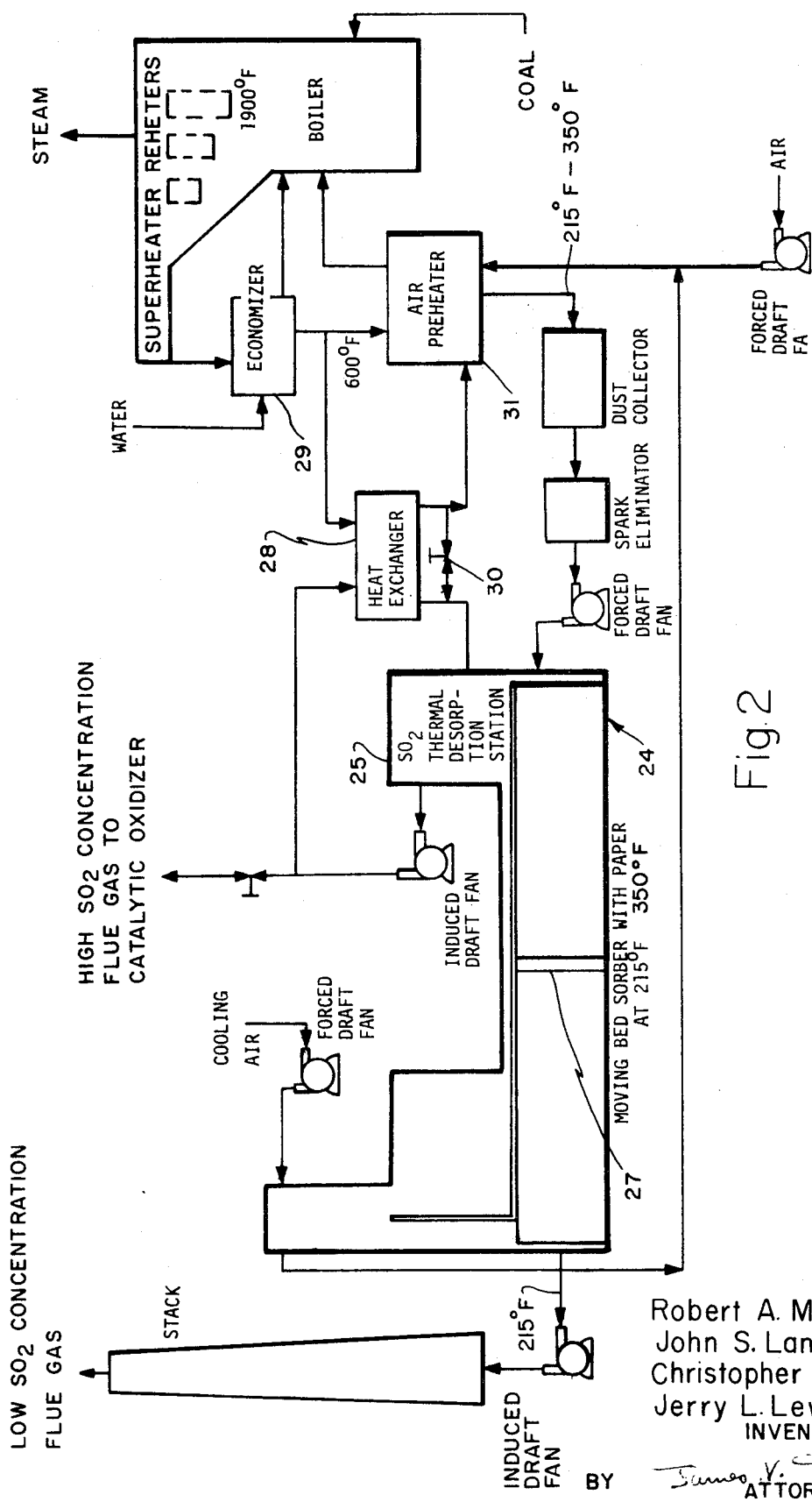

In the diagrams, FIGS. 1 and 2 are schematic representations of a thermal generating station employing the sulfur dioxide removal system of this invention.

The operation of the invention is shown in the diagrams which illustrate a thermal generating plant that burns coal, and the sulfur dioxide recovery unit of this invention that employs cellulose as the sorbing medium. In FIG. 1, a thermal generating plant 10 is shown utilizing coal as the power source; steam produced from the coal-burning operation is employed to generate electricity. Off gas containing $SO_2$ e.g., about 3,000 p.p.m. is passed through a heat exchanger 11 which reduces the off gas temperature from about 750° to about 600° F. If desired, the temperature of the off gas can be controlled by injection of water vapor; this may also reduce static charge and prevent the cellulose from becoming too dry. It is also possible that for an optimum water content in the off gas, the sorption process will be aided; however, clearcut evidence on this point is uncertain.

In the sorption mode, part of the off gas is passed into an air preheater 12 where it is heat-exchanged with atmospheric air which has been forced into the air preheater by means of a forced draft fan 13. The flue gas is then passed from the air preheater at a temperature of about 215°–350° F. through a dust collector 14 and a spark eliminator 15, and then pumped by a draft fan 16 into a horizontal conduit 17, which is set for sorption operations. The cellulose, which is preferably shredded newspaper, is forwarded as a moving bed along the conduit 17 countercurrent to the flue gas flow; preferably the moving bed of shredded paper is conveyed in large screen mesh baskets, or the paper may be forwarded by means of a screw device. In commercial operation, a moving bed of cellulose is necessary to maintain rapid desorption times.

Moving bed speeds will depend on parameters such as $SO_2$ concentration in the flue gas, weight of paper in the column, volume and rate of flue gas movement, sorption and desorption temperatures, $SO_2$ pickup rate, $SO_2$ capacity of the paper at saturation, etc.

Preferably the sorption of sulfur dioxide is allowed to continue as long as the paper removes an average of about 95 percent by volume of the sulfur dioxide from the flue gas stream.

After leaving the sorption conduit 17, the sulfur dioxide lean flue gas is passed into an induced draft fan 18 where it is forced up the vertical stack 19 and into the atmosphere. When the cellulose in the sorption conduit 17 has been saturated with sulfur dioxide (about 0.1 lbs., $SO_2$/lb. of paper), it is passed into a horizontal desorption conduit 21.

In the desorption mode, off gas is passed directly from the heat exchanger 11 at about 350°–450° F. through the spark eliminator 20 and then to the desorption conduit 21 at about the same temperature; this causes the sulfur dioxide to be desorbed from the shredded paper which is moving countercurrent to the off gas. If conditions warrant, the off gas can be pulsed into the desorber and the paper can be maintained stationary or operated as a moving bed; pulsing may be accomplished using fan 16'. The sulfur dioxide emitted from the desorption conduit is then forwarded to a processing unit, such as a sulfuric acid plant, etc.

Referring again to FIG. 1, paper for replenishing the regeneration and sorption conduits is supplied from a paper shredder 22 and into a paper addition conduit 23 where it is transferred into a suitable conveyor system such as aforementioned. The paper addition conduit 23 also may be employed as a regeneration unit or sorption unit. Operated in this manner, paper makeup from the shredder is supplied to each of the conduits 17, 21, 23 through their inlets, and small amounts of paper are removed continually from their outlets and sent to the thermal plant 10 for burning. This continual replenishment will ensure a reasonable fresh supply of paper being maintained in the system. If the paper has a suitable structure, it may be possible to replace a complete basket of it at one time and either burn it or use it for a carbohydrate precursor.

The feature of the embodiment shown by FIG. 2, is the sorption conduit 24 and desorption conduit 25 that are connected together to form a closed system. A moving bed of finely divided cellulose is provided in the conduit 24, a segment 27 of the moving bed, which could represent a basket of cellulose, being shown schematically.

Also of interest in FIG. 2, part of the flue gas is shown being recirculated from the desorption conduit 25 through a heat exchanger 28 which maintains its temperature at high level, e.g., about 450° F. The heat exchanger 28 is heated by flue gas leaving the economizer heat exchanger 29. A valve 30 is provided to permit bypassing some of the hot flue gas leaving the heat exchanger into the hot recirculating desorption flue gas stream; this permits greater flexibility of operation.

The cooled flue gas leaving the heat exchanger 28 is passed into the air preheater 31 where it is heat exchanged with air and then forwarded to the sorption conduit 24.

By recirculating the hot flue gas through the desorption conduit 25, the sulfur dioxide content will build up to at least 9 percent level; this is considered the minimum level at which conversion to sulfur trioxide may be performed economically. Of course, if some use other than conversion to sulfuric acid was made of the sulfur dioxide, the necessity for recycling could be eliminated; this would be dictated by operating economics.

Accordingly, it will be seen that the sulfur dioxide sorbing system of the present invention employing cellulose and operating at high sorption and desorption temperatures is both efficient and inexpensive. The process employs cheap raw materials, such as newsprint, which would normally have to be disposed of as waste, and converts toxic sulfur dioxide in the off gas to a valuable byproduct such as sulfuric acid. The cellulose not only sorbs the sulfur dioxide but also removes fly ash from the off gas. When the cellulose loses its sorption properties, it can be forwarded to the conversion plant for burning thereby supplying additional thermal energy to the generating process; alternately, spent cellulose due to $SO_2$ digestion, can be employed as a precursor in the manufacture of carbohydrates.

What is claimed is:

1. A process for recovering sulfur dioxide from off gas which comprises:
  a. sorbing the sulfur dioxide in the off gas with a moving bed of finely divided cellulose at a temperature of about 215–300° F.;
  b. desorbing the sulfur dioxide from the cellulose with off gas at a temperature of from about 350° F. to below the decomposition temperature of the cellulose; and
  c. recovering the sulfur dioxide.

2. The process of claim 1 in which the desorption temperature range is about 350° to about 450° F.

3. The process of claim 1 in which the off gas is pulsed through the cellulose to desorb the sulfur dioxide.

4. The process of claim 1 in which water vapor is injected into the off gas.

5. The process of claim 1 in which desorption is applied after about 0.1 parts of sulfur dioxide has been sorbed per part of cellulose.

6. A process for producing a carbohydrate precursor which comprises:
  a. sorbing sulfur dioxide contained in an off gas with a moving bed of finely divided cellulose at temperatures of about 215° to about 300° F.;
  b. desorbing the sulfur dioxide at temperatures of about 350° to 450° F.; and
  c. repeating the sorbing and desorbing steps until the cellulose is suitably for hydrolysis to carbohydrates.

7. The process of claim 6 in which the carbohydrate precursor is a cellulose·$SO_2$ compound.

* * * * *